Jan. 7, 1941.   L. G. LOMBI   2,227,728
RAVIOLI MACHINE
Filed Oct. 5, 1939   2 Sheets-Sheet 1

INVENTOR
LOUIS G. LOMBI
BY Philip S. McLean
ATTORNEY

Jan. 7, 1941.   L. G. LOMBI   2,227,728
RAVIOLI MACHINE
Filed Oct. 5, 1939   2 Sheets-Sheet 2
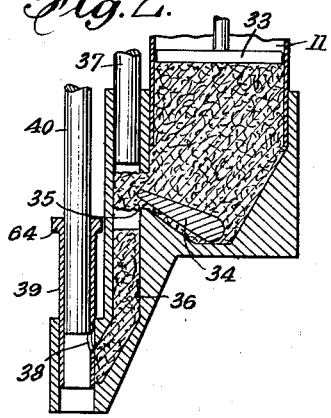
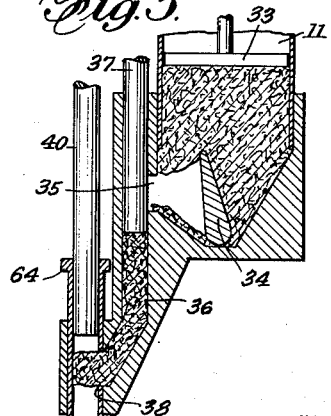
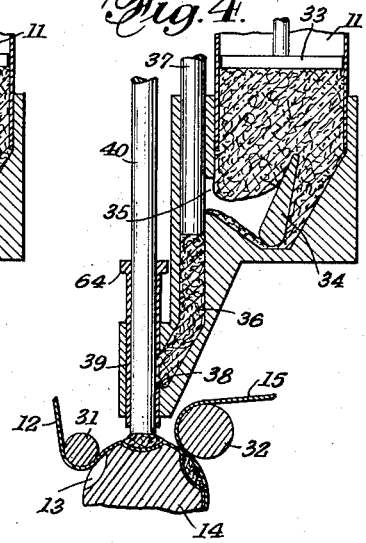
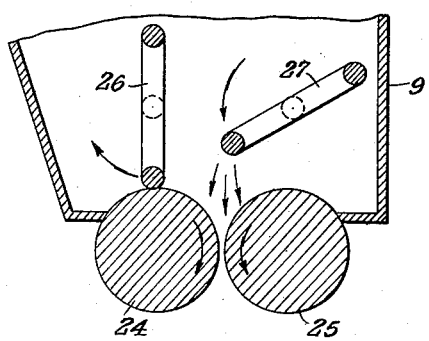
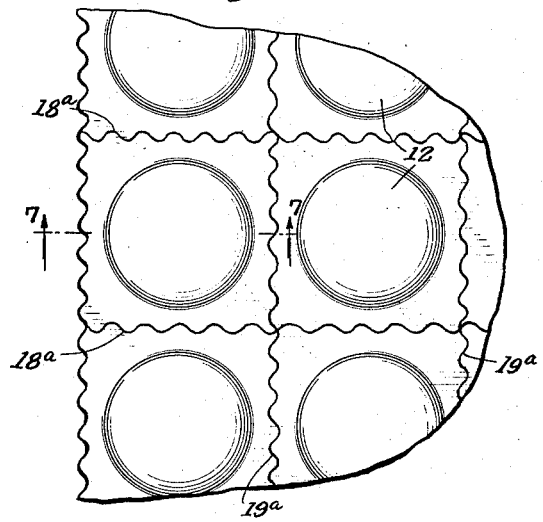
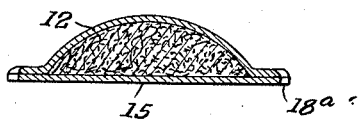
INVENTOR
LOUIS G. LOMBI
BY
ATTORNEY Patented Jan. 7, 1941

2,227,728

UNITED STATES PATENT OFFICE 2,227,728

RAVIOLI MACHINE

Louis G. Lombi, West Englewood, N. J.

Application October 5, 1939, Serial No. 298,019

9 Claims. (Cl. 107—1)

The invention here disclosed relates to the manufacture of ravioli and generally similar products.

Objects of the invention are to accomplish proper sheeting and feeding of the dough or pastry material, the segregating and depositing of measured charges of filling material over a die cavity, on one of the sheets, the smooth laying of the other sheet over the deposited material and finally the severing of the assembled filled sheets into cakes and the orderly laying of such cakes in trays or pans for further handling, shipment, cooking or other treatment.

Further objects are to provide simple, practical and efficient apparatus for carrying out the several steps and in the nature of a machine which can be sold at low cost and be used by various operators without previous training or special skill.

Other objects and the novel features of the invention are set forth or will appear in the course of the following specification.

The drawings accompanying and forming part of the specification illustrate one practical commercial embodiment of the invention. The structure however may be modified and changed as regards this particular disclosure, all within the true intent and broad scope of the invention as hereinafter defined and claimed.

Figs. 2, 3 and 4 are broken sectional details illustrating successive steps in the operations of measuring out, feeding and delivering measured charges of filling material to one sheet of dough on the die roller in position to be covered by the backing sheet.

Fig. 5 is a broken sectional detail of the dough feeding and sheeting mechanism.

Figs. 6 and 7 are broken plan and sectional views of the final product, Fig. 7 being taken as on line 7—7 of Fig. 6.

Figure 1:
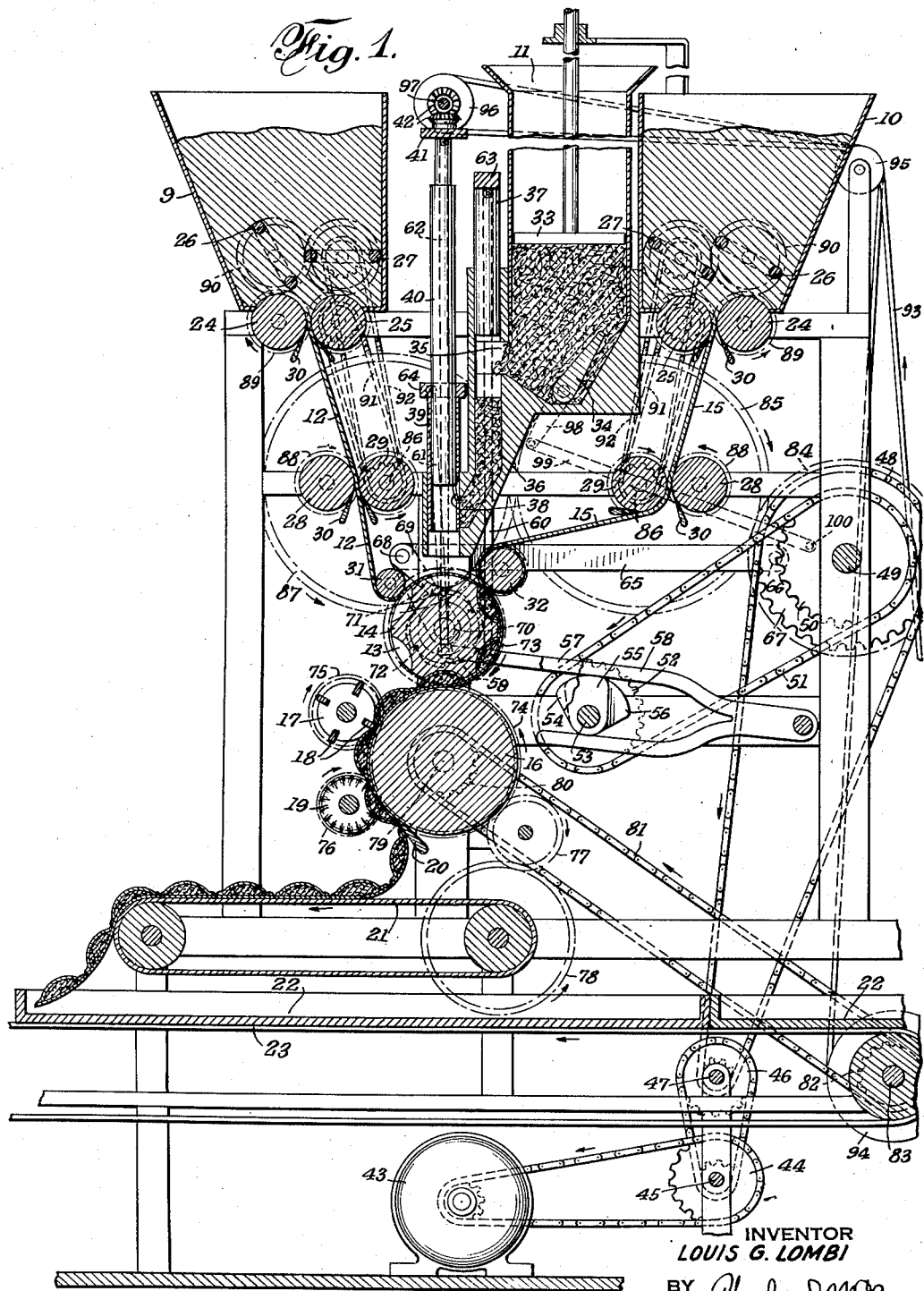
Fig. 1 is a broken part sectional view illustrating the co-relation and operation of the various parts of the machine.

In the general view, Fig. 1, the machine is shown as embodying a pair of hoppers 9, 10 for holding the dough or other material to be sheeted, with a hopper 11, for the filling material located between the dough hoppers and mechanism associated with the latter for measuring, cutting off, feeding out and delivering measured charges of the filling onto one dough sheet 12, over cavities 13, in die roll 14, in position to be covered by the backing sheet 15.

The assembled layers of dough or other sheeting, with the deposits of filling material between, pass downwardly about the back of the die roll and over the top of a support roll 16, which carries the assembled sheets beneath a rotary cutter 17, having blades 18, which cut, score or weaken the sheets across transversely and circular knives 19, which cut, score, indent or weaken the sheets on longitudinal lines.

From the cutter roll 16, the severed or partly severed cakes, still in more or less sheet-like formation are stripped by the blade or guide 20, onto a travelling belt 21, which deposits them in trays 22, advanced by belt conveyor 23.

The sheeting mechanisms at the dough hoppers are alike and are shown as consisting in each instance of a pair of spaced sheeting rolls 24, 25, each with a two armed beater and mixer 26, 27, above the same and rotating as in Fig. 5, inwardly and downwardly toward the pass between the rolls. These beaters are timed so that the arms will act alternately to force and press the dough downwardly toward the pass and to then engage, actually or substantially, the companion roll to more or less cut away the dough at the back of the rolls.

Below the sheeting and feeding out rolls at the bottom of each dough hopper is a second pair of cooperating sheet feeding rolls 28, 29. Stripper blades 30, are shown associated with the several sheeting and feeding rolls.

The dough sheet 12, is led downward under a guide roll 31, which lays this sheet over the top of die roll 14. The second dough sheet 15, passes downwardly over the top of a guide roll 32, which lays this sheet over the back of the first sheet, which at the time has the charges of filler deposited thereon.

The filling material is pressed downwardly in hopper 11, by a follower 33, in front of an oscillating blade 34, which, on its forward stroke, forces a measured charge of the material out through a discharge opening 35, as in Fig. 2, into a vertical passage 36, below a feed plunger 37. The latter as it lowers to the position shown in Fig. 3, cuts off the charge from the material in the hopper and forces it down through passage 36, and through a port 38, in a valve or cut-off sleeve 39, into position below a final feed or delivery plunger 40, operating down through said sleeve.

The plunger 40, as illustrated in Figs. 3 and 4, has a movement sufficient to carry the previously measured charge of filling material downwardly onto the first dough sheet 12, and to lightly force the charge, with the sheet ahead of it into the underlying cavity 13, in the die roll 14.

In the present disclosure, the feed passage 36, is of such length that a certain amount of filling material, as shown in Fig. 2, remains in this channel and forms a connecting link, Fig. 3, between that portion of material ahead of plunger 37, just previously taken out of the hopper and that portion of material forced through port 38, in front of delivery plunger 40. The last mentioned portion is substantially equal and equivalent to that portion measured out of the hopper and so the operation may be considered simply as measuring a charge out of the hopper and then advancing and delivering that or equivalent charge onto the dough sheet. If desired, the mechanism can be modified to deliver that same charge of material just removed from the hopper, but for practical purposes, it is satisfactory to feed the material as illustrated, by adding to the end of a column of material from which an equivalent charge of material is cut off for each feeding action.

To slightly compact the charge and to prevent it from sticking to the end of the delivery plunger 40, as the latter is retracted, this plunger is shown as rotatably mounted in the head 41, by which it is reciprocated and as positively rotated by bevel gearing 42, Fig. 1.

The drive of the several parts is effected in the illustration as shown in Fig. 1. A motor 43, operates by sprocket gearing 44, a shaft 45, which through a second line of sprocket gearing 46, operates shaft 47. From the latter, a set of sprocket gear connections 48, 67, drives shaft 49. The latter carries a sprocket gear 50, driving through chain 51, and sprocket gear 52, a cam shaft 53.

Cam shaft 53, carries three cams 54, 55, 56, operating respectively the arms 57, 58, 59, connected by links 60, 61, 62, with the heads 63, 64 and 41, carrying respectively the cut-off and feeding plunger 37, the ported valve sleeve 39, and the rotating delivery plunger 40.

Intermittent step-by-step motion is imparted to other portions of the apparatus from a link 65, pivoted to a crank pin 66, on the sprocket gear 67, on shaft 49, said link being connected at its opposite end at 68, with a lever 69, rocking on the die roll center 70, and carrying a drive pawl 71, engaging the ratchet teeth 72, on the end of or fixed to the die roll.

The die roll 14, carries or has fixed to it a gear 73, in mesh with a gear 74, connected with the cutter roll 16. Gear 74 is in mesh also with gears 75, 76, driving the transverse and longitudinal cutters 17, 19, and in mesh as well with idler 77, driving the gear 78, for the apron conveyor 21.

The shaft 79 of cutting roll 16, carries a sprocket pinion 80, which through chain 81, and pinion 82, on shaft 83, drives the belt conveyor 23.

For operating the dough sheeting and kneading devices, the shaft 49 carries a gear 84, in mesh with a gear 85, on the shaft 96, of the lower sheeting roll 29, at the right in Fig. 1. The corresponding sheeting roll 29, at the left in Fig. 1, is driven by gear 87, in mesh with gear 85. The lower pairs of sheeting rollers 28, 29, are geared together as indicated at 88. Similarly, the upper pairs of sheeting rollers 24, 25, are geared together as indicated at 89. The beaters 26, 27, likewise are geared together in pairs at 90, drive chains 91, 92, from the shafts of the lower innermost sheeting rolls 29, operating the upper sheeting rolls and the beaters respectively.

The bevel gearing 42, for turning the delivery plunger 40, is shown as operated by belt 93, extending from pulley 94, on shaft 83, up over guide pulleys 95, to a pulley 96, on the horizontal bevel gear shaft 97.

The charge separating and feeding out blade 34 is shown as oscillated by means of a crank arm 98, Fig. 1, connected by link 99, with a crank pin 100, on the gear 50, of shaft 49.

From the foregoing, it will be apparent that the dough in hoppers 9 and 10, will be kneaded and worked by the double armed beaters 26, 27, to the sheeting rolls 24, 25 and that the sheets of dough 12 and 15, will be smoothed and advanced by the lower pair of rollers 28, 29. The first sheet 12, is laid by roll 31, over the top of die roller 14 and the second sheet 15 is laid by roller 32, at the back of the die roller, over the previously laid sheet and after the charge of filling material has been deposited on the first layer by the delivery plunger 40. While for simplicity of description only a single plunger has been mentioned, it is understood that ordinarily, there will be a row of such plungers and companion parts, one for each cavity in the die roller.

As the feed blade 34 swings back as shown in Fig. 1, the filling material in hopper 11, settles down in front of the blade, so that on the forward stroke, Fig. 2, a quantity of the material will be forced out through port 35, into position in front of plunger 37. As this plunger comes down, the valve sleeve 64, is lowered as in Fig. 3, to register the port 38, therein with the lower end of passage 36, thus to admit a quantity of the material into position in front of the delivery plunger 40. Then, while the cut-off plunger 37, still remains in lowered position and the valve sleeve is lowered to serve as a guide directly over the die cylinder, the plunger 40, comes down to place the charge on the dough sheet 12, and to force this sheet into the registered die cavity. The rotation imparted to this delivery plunger enables this seating pressure to be applied without the material sticking to the plunger as it is retracted.

The second dough sheet 15 is firmly pressed over the filled first sheet by roller 32, and as the assembled sheets pass downwardly over and onto the larger supporting roll 16, the cutter bars 18, first sever or weaken the sheets on the transverse lines 18a, Fig. 6 and discs 19, then sever or weaken the sheets on the longitudinal lines 19a, thus to separate or outline the individual cakes which pass on as such, onto the top run of apron 21, which advances them into the trays 22, on conveyor 23.

The number, size and shape of the cakes produced may be greatly varied and while particularly suited to the manufacture of ravioli, it will be appreciated that the invention may be utilized for the production of various other articles.

The operation is automatic, requiring no special attention or skilled operator. The sleeve 39, in reciprocating toward and away from the die cylinder, provides a guide for the charge of filling material insuring that it will accurately center over and then be forced by the plunger to fill the die cavity. By segregating the filling material into separate charges, there is no overflow or waste and the two layers of sheeting material can meet and seal together about the interposed material deposited between them.

The die cavities can be made to produce cakes of various shapes and these when cut apart may be automatically packed or stacked in suitable containers.

What is claimed is:

1. In a machine of the character disclosed, the combination of means for sheeting material in two layers, a roll having die cavities, means for laying one layer of such material over the top of said die roll, means for forming separated charges of material and for depositing said separated charges of material on top of said layer over said cavities in the die roll and means for laying said second layer of sheeted material over said first layer on said die roll and over the charge of material so deposited on said first layer, said charge depositing means including a vertically operating plunger over the top of said die roller having a stroke sufficient to force the charges of material and the first layer into said cavities in the die roller.

2. In a machine of the character disclosed, the combination of means for sheeting material in two layers, a roll having die cavities, means for laying one layer of such material over said die roll, means for forming separated charges of material and for depositing said separated charges of material on said layer over said cavities in the die roll and means for laying said second layer of sheeted material over said first layer on said die roll and over the charge of material so deposited on said first layer, said charge depositing means including a plunger having a stroke sufficient to force the charges of material and the first layer into said cavities in the die roller and mechanism for imparting rotary motion to said plunger to clear it from the deposited material.

3. In a machine of the character disclosed, the combination of means for sheeting material in two layers, a roll having die cavities, means for laying one layer of such material over said die roll, means for forming separated charges of material and for depositing said separated charges of material on said layer over said cavities in the die roll and means for laying said second layer of sheeted material over said first layer on said die roll and over the charge of material so deposited on said first layer, said material depositing means including a tubular guide reciprocable toward and away from the die cylinder and a delivery plunger operating in said guide.

4. In a machine of the character disclosed, the combination of means for sheeting two separate layers of material, a die roller having die cavities, means for leading one layer of sheeted material onto said roll at one side and over the top of said die roll, means for leading the other layer of sheeted material over the first layer, at the opposite side of said die roll and means for depositing separate charges of filling material on the single, first laid layer of sheeted material on the die roll over the top of said roll, between the points of laying on of the separate layers at said opposite sides of said die roller, said last means including mechanism for forming separate charges of filling material and a plunger operating over the top of said die roll in between the points of laying on the separate layers at opposite sides of the die roller for positively forcing the separate charges into the cavities in the die roller.

5. In a machine of the character disclosed, the combination of cooperating sheeting rollers in spaced relation and rotating toward each other to form a sheeting pass and a pair of rotary mixing arms cooperating with each of said sheeting rollers, said mixing arms of the respective sheeting rollers being geared together to turn inwardly toward the pass between the sheeting rollers.

6. In a machine of the character disclosed, the combination of a hopper having a discharge port in one side, a delivery passage leading from said port, a blade oscillating in said hopper to pass material in the hopper out through said discharge port into said delivery passage, a feed plunger operating in said delivery passage adjoining said discharge port and a delivery plunger operating in the opposite end of said delivery passage.

7. In a machine of the character disclosed, the combination of a hopper having a discharge port in one side, a delivery passage leading from said port, a blade oscillating in said hopper to pass material in the hopper out through said discharge port into said delivery passage, a feed plunger operating in said delivery passage adjoining said discharge port and a delivery plunger operating in the opposite end of said delivery passage and a valve sleeve at the delivery end of said passage and controlling admission of material from said delivery passage to said delivery plunger.

8. In a machine of the character disclosed, the combination of a hopper having a discharge port in one side, a delivery passage leading from said port, a blade oscillating in said hopper to pass material in the hopper out through said discharge port into said delivery passage, a feed plunger operating in said delivery passage adjoining said discharge port and a delivery plunger operating in the opposite end of said delivery passage, a valve sleeve at the delivery end of said passage and controlling admission of material from said delivery passage to said delivery plunger, said delivery plunger operating in said valve sleeve, means for reciprocating said valve sleeve to project the same as a guide and a support for sheeted material adjacent the end of said sleeve when so projected as a guide.

9. In a machine of the character disclosed, the combination of a hopper for filling material, a feed blade oscillating in said hopper, a delivery passage receiving material advanced by said feed blade, a plunger for advancing the fed material in said delivery passage, a ported valve sleeve at the discharge end of said passage, means for reciprocating said valve sleeve to alternately carry the port therein into and out of registering relation with the material passage, a delivery plunger operating in said valve sleeve, a die roller having die cavities therein to register with said delivery plunger, dough hoppers at opposite sides of said filling material hopper, dough sheeting means associated with each dough hopper, means for leading the sheeted material from one hopper to one side and over the top of said die roller, means for leading sheeted material from the other hopper to the other side of said die roller and over the first layer of material laid thereon.

LOUIS G. LOMBI.